United States Patent [19]

Carroll

[11] 4,171,404

[45] Oct. 16, 1979

[54] POLYMER-MODIFIED, ACID DYEABLE POLYESTER AND POLYOLEFIN TEXTILE MATERIALS AND METHOD FOR PRODUCING SAME

[75] Inventor: Clifford C. Carroll, Spartanburg, S.C.

[73] Assignee: Milliken Research Corporation, Spartanburg, S.C.

[21] Appl. No.: 893,924

[22] Filed: Apr. 5, 1978

Related U.S. Application Data

[63] Continuation of Ser. No. 770,879, Feb. 22, 1977, abandoned.

[51] Int. Cl.$^2$ .................. B32B 27/38; B32B 27/06; B32B 27/32; B05D 3/02
[52] U.S. Cl. .................. 428/413; 427/354; 427/390 R; 428/474; 428/480; 428/521; 428/523; 427/386
[58] Field of Search .................. 427/354, 390 R, 386; 428/413, 474, 480, 521, 523

[56] References Cited

U.S. PATENT DOCUMENTS

| | | | |
|---|---|---|---|
| 2,379,413 | 7/1945 | Bradley | 260/404.5 |
| 2,450,940 | 10/1948 | Cowan et al. | 260/404.5 |
| 2,764,601 | 9/1956 | Garceau | 260/404.5 |
| 2,829,071 | 4/1958 | Schroeder | 427/386 X |
| 3,033,706 | 5/1962 | Pardo et al. | 427/386 X |
| 3,044,843 | 7/1962 | Tullio | 8/17 |
| 3,049,445 | 8/1962 | Lundgren et al. | 427/389 X |
| 3,335,105 | 8/1967 | Burnthall | 260/29.2 |
| 3,397,032 | 8/1968 | Mather et al. | 8/100 |
| 3,436,359 | 4/1969 | Hubin et al. | 260/2 |
| 3,553,111 | 1/1971 | Ginilewicz et al. | 260/2 |
| 3,580,887 | 5/1971 | Hubin | 260/47 |
| 3,761,522 | 9/1973 | Schneider et al. | 260/583 P |
| 3,779,703 | 12/1973 | Tesoro | 8/115.5 |
| 3,807,946 | 4/1974 | Harper et al. | 8/18 |
| 3,839,372 | 10/1974 | Schneider | 260/404.5 |
| 3,843,391 | 10/1974 | Toepfl et al. | 427/389 X |

FOREIGN PATENT DOCUMENTS

1374181 11/1974 United Kingdom .................. 427/386

OTHER PUBLICATIONS

Lee, H. et al., Epoxy Resins, McGraw-Hill Co., New York, 1957, pp. 166-168.
Journal of Applied Polymer Science, vol. 12, pp. 461-480 (1975), "Grafting on Polyester Fibers", Kale et al.
Textile Chemist Colorist, vol. 1, No. 9, pp. 220-224, "The Continuous Dying of Tufted Nylon Carpets", Olson.
Encyclopedia of Polymer Science & Technology, vol. 15, pp. 314-319, "Internally Colored Polymers", Allen & Kuhn.

Primary Examiner—Michael R. Lusignan
Attorney, Agent, or Firm—H. William Petry

[57] ABSTRACT

A composition for improving the acid dyeing properties of polyester or polyolefin materials, as well as the adhesion properties of such materials to vinyl coatings, such composition being the reaction product of a polyamide and a polyepoxide having at least two 1,2-epoxy groups per molecule. Application of the composition to polyester or polyolefin materials is set forth as is a vinyl-coated, acid-dyed, polymer modified polyester or polyolefin textile material.

20 Claims, No Drawings

POLYMER-MODIFIED, ACID DYEABLE POLYESTER AND POLYOLEFIN TEXTILE MATERIALS AND METHOD FOR PRODUCING SAME

This is a continuation of application Ser. No. 770,879, filed Feb. 22, 1977, now abandoned.

This invention relates to compositions of matter formed by the reaction between polyamides and epoxy compounds and the use of such compositions to impart improved dyeing properties to textile materials containing synthetic fibers of polyester or polyolefins. In one aspect it relates to an improved method for dyeing textile materials containing synthetic fibers of polyester and polyolefins which, when the dyed materials are thereafter treated with a polymeric material, reduces and/or substantially eliminates migration of the dyestuff from the dyed textile materials into the polymeric coating. In another aspect it relates to a polymer-modified textile material containing polyester or polyolefin fibers having improved dyeability and adhesion to vinyl coating properties. In yet another aspect it relates to a vinyl-coated, acid dyed, polymer modified textile material containing polyester or polyolefin fibers in which migration of dyestuff from the acid dyed polymer-modified textile material is reduced and/or substantially eliminated.

Most of the synthetic fibers and plastics used in the textile industry to produce textile materials, such as polyester fibers and polypropylene, are colorless. In order to achieve the desired color or artistic and decorative effects, colorants are added to these materials. In the case of textile materials produced from synthetic fibers, such as polyester fibers, color is generally imparted to the materials through a dyeing process, such as dyeing with disperse dyes. However, when employing such dyeing process to impart color to a polyester material which is to be subsequently coated with a polymeric material, such as plasticized polyvinyl chloride, problems have been encountered due to migration of the dyestuff from the dyed polyester into the polymeric coating.

Other methods, such as modification of polyester fibers, have been proposed heretofore to color textile materials produced from polyester fibers. For example, dope dyeings have been employed to produce colored polyester fibers. However, such dyeing techniques have not been generally acceptable because of the numerous manufacturing and handling problems. Other attempts have been made to chemically modify polyester fibers so that the fibers are dyeable by various dyes. However, the chemically modified polyester fibers so produced have suffered from the disadvantages of cost, availability and loss of strength.

Textile materials produced from polyolefin fibers, such as polypropylene, have been dyed by incorporation of dye receptive sites or dyestuff molecules into the polymer during polymerization. Such has generally been accomplished by copolymerization or grafting techniques. Another technique for imparting color to polyolefins has been to incorporate a predetermined amount of pigment into the polyolefin resin prior to melt extrusion of same.

While the above prior art methods have provided ways to dye or color synthetic fibers, such as polyester or polyolefin, problems have nevertheless been encountered. Such problems have been, in the case of polyester, severe crocking and migration of the dyestuff from the dyed fabric, especially when the fabric is coated with a polymeric material, such as plasticized vinyl. Further, in the case of polyolefins, such as polypropylene, severe limitations of color flexibility have been encountered resulting either in the necessity of large inventories of certain colored polyolefins or the use of the uncolored polyolefins.

Thus, new and improved polyester and polyolefin containing textile materials and methods for improving the dyeability of such textile materials which do not suffer from the disadvantage of the prior art materials and methods are constantly being sought.

Therefore, an object of the present invention is to provide a method for improving the dyeing characteristics of textile materials containing polyester or polyolefin fibers which does not suffer from the before-mentioned disadvantages of the prior art methods. Another object of the invention is to provide a composition which, when applied to textile materials containing polyester or polyolefin fibers, does not impair the strength of such fibers while substantially eliminating migration of the dyestuff from the dyed textile material into an adjacent polymeric coating. Another object of the invention is to provide a vinyl coated, dyed polyester fabric in which migration of dyestuff from the dyed fabric into the vinyl coating is retarded. These and other objects, advantages and features of the present invention will become apparent to those skilled in the art from a reading of the following disclosure.

According to the present invention I have discovered a novel composition which readily improves the dyeing characteristics of textile materials containing polyester or polyolefin fibers which comprises the reaction product of a polyamide and a polyepoxide having at least two 1,2-epoxy groups, i.e.

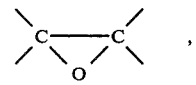

per molecule.

Further according to the invention I have discovered a method for improving the dyeing characteristics of textile materials containing polyester or polyolefin fibers which comprises forming an aqueous admixture containing from about 0.5% to about 50 weight percent of a polyamide, an effective amount of a volatile organic acid to neutralize free amine moieties of the polyamide and provide a pH level in said aqueous admixture of less than about 7, and from about 5 to about 500 weight percent, based on the amount of the polyamide, of a polyepoxide having at least two 1,2-epoxy groups per molecule; applying the aqueous admixture to a textile material containing polyester or polyolefin fibers; heating the wetted textile material to a temperature effective to remove the water and regenerated organic acid constituent and maintaining the textile material containing the polyamide and the polyepoxide at the elevated temperature for a period of time effective to allow reaction between the polyamide and the polyepoxide compound; curing the resulting treated textile material; and, recovering a treated textile material having improved dyeing characteristics.

Still further according to the invention I have discovered a novel vinyl-coated, acid dyed, polymer modified textile material containing polyester or polyolefin fibers which comprises a textile material substrate formed of polyester or polyolefin fibers having impregnated therein from about 0.1 to about 10 weight percent of a cured polymeric constituent formed as the reaction product of a polyamide and a polyepoxide having at least two 1,2-epoxy groups per molecule which has been dyed with an anionic dyestuff to provide acid-dyed polymer-modified polyester fabric and a vinyl coating on said dyed polymer modified polyester fabric, said vinyl coating having a thickness of from about 0.1 to about 50 mil.

The polyamides used in the practice of the present invention are those derived from the reaction between polyamines and polybasic acids which contain at least one functional group represented structurally as

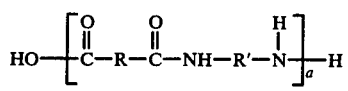

wherein R is an alkyl, alkylene, cycloalkyl or cycloalkylene group, such as

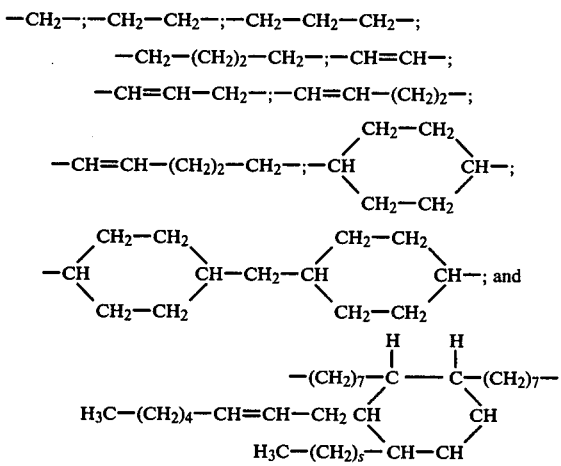

and R' is an alkyl, cycloaliphatic, aromatic or alkyl substituted amine, such as —(CH$_2$)—;  —(CH$_2$)$_2$;  —(CH$_2$)$_3$—(CH$_2$)$_2$—NH—(CH$_2$)$_2$—;
—(CH$_2$)$_2$—NH—(CH$_2$)$_2$—NH—(CH$_2$)$_2$—NH—(CH$_2$)$_2$—;
—(CH$_2$)$_3$—NH—(CH$_2$)$_3$;  —(CH$_2$)$_3$—;

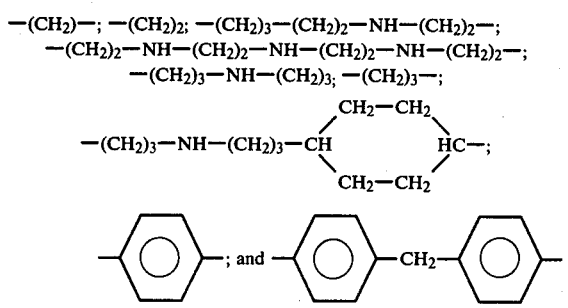

and the like, and a is an integer of from 1 to about 10.

Especially desirable are the polyamides formed by the amination of a polymerized fatty acid, such polyamides being generally represented by the formula

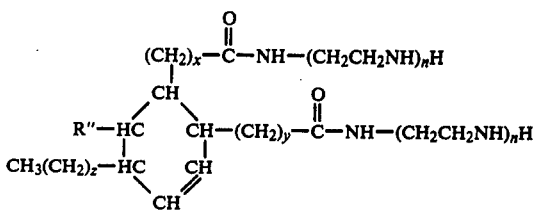

wherein R" is an alkyl, alkylene, cycloalkyl or cycloalkylene group as defined hereinbefore, x, y and z are each integers of from 0 to about 12, and n is an integer of from 1 to about 4. For example, R" will be H$_3$C—(CH$_2$)$_4$—CH═CH—CH$_2$— when the polyamide is formed from a dimer acid resulting from the Diels-Alder cyclization reaction between 9, 12 and 9, 11 linoleic acids, n will be 2, x and y will be 7 and z will be 5.

Methods of preparing these polyamides by condensation of polyamines and polycarboxylic acids are well known in the art, such being illustrated by U.S. Pat. Nos. 2,450,940 and 3,049,445, each of which is hereby incorporated by reference.

For example, polyamides can be made by the condensation of polymerized vegetable oil acids with a polyamine compound. The condensation of the fatty acid to produce the polyamide generally consists of blending the fatty acid with the polyamine at a low temperature in an autoclave which is equipped with an efficient agitator. Thereafter, while stirring the resulting blend, the temperature is gradually raised to a temperature where water from the reaction commences to form and can be removed by distillation. The water is distilled out at a rate such that the distillate temperature does not rise above 100° C. When the distillation of the by-product water reaches the stage where it is so slow as to be negligible at a reaction temperature in the range of about 150° C. to about 250° C., a vacuum may be applied to force the reaction to a state of advanced condensation. After the reaction has gone to substantial completion, the vacuum is released with an inert gas and the product, e.g. the polyamide, is recovered from the reactor.

The physical properties of the polyamide will vary widely depending upon the particular fatty acid and polyamine chosen initially for the reaction. For example, the polyamide so prepared may be liquid at room temperature or, in some instances, may have a melting temperature as high as 185° C.

It should be noted that the above described polyamides are prepared using an excess of the amine constituent. The molecular weight of the polyamide can be widely varied depending upon whether the amine constituent and fatty acid are di- or trifunctional. For example, if a difunctional fatty acid is reacted with a difunctional amine a low molecular weight polyamide will generally be formed. However, if either the fatty acid or the amine constituent is difunctional and the other is a trifunctional component, and if both constituents are reacted in appropriate proportions, it is possible to form high molecular weight polyamides containing either free amino or carboxyl groups in the polymer.

In order to further illustrate the formation of polyamides useful in preparing the compositions for imparting improved dyeing characteristics to textile materials containing polyester and/or polyolefin fibers the following overall reaction is set forth.

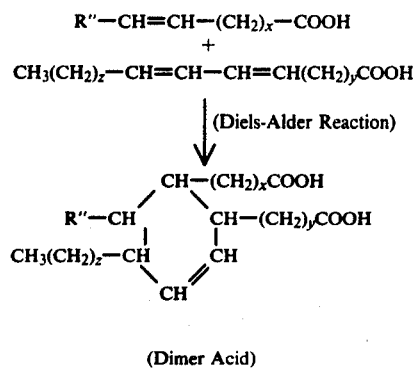

(Dimer Acid)

wherein x and y are integers of from about 0 to about 12, preferably 7 to about 11, z is an integer of from about 0 to about 12, preferably 4 to about 7, and R" is

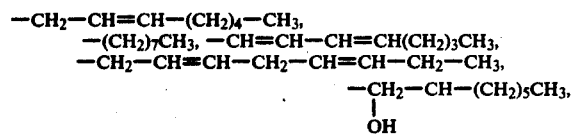

and the like.

The dimer acid so formed is then reacted with a polyamine as follows:

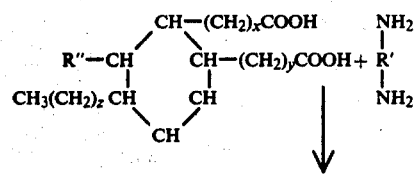

-continued

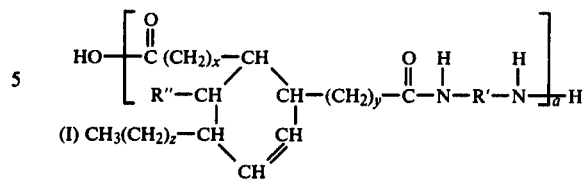

(I) $CH_3(CH_2)_z$— wherein R' is

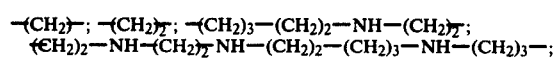

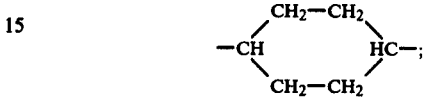

and the like, R" is as previously defined, a is a integer of from 1 to about 10, and x, y and z are as previously defined.

The polyamide so produced, as represented by (I) is then reacted with a polyepoxide having at least about two 1,2-epoxy groups, i.e.

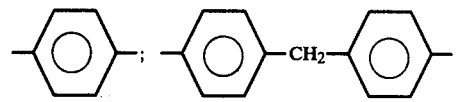

groups, per molecule.

Illustrative of such reaction is:

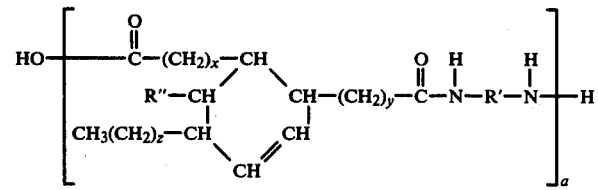

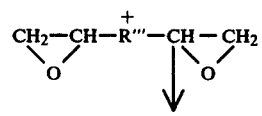

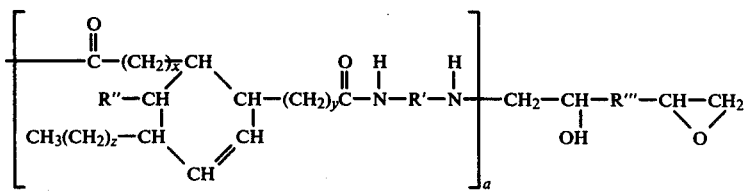

wherein a, x, y, z and R' and R" are as previously defined and R''' is a saturated or unsaturated aliphatic, cycloaliphatic, aromatic or heterocyclic group and such will be dictated by the particular polyepoxide employed in the above reaction. Typical of such groups which can be R''' are —$CH_2$—($CH_2$)$_2$—$CH_2$—; —$CH_2$—($CH_2$)$_4$—$CH_2$—; —$CH_2$—O—($CH_2$)$_4$—O$CH_2$—;

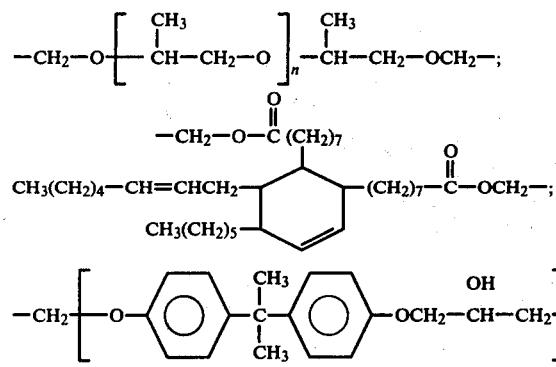

where n varies between zero and about 10.

Examples of suitable acids which can be employed to produce the polyamides described above are the unsaturated aliphatic carboxylic acids, e.g. fatty acids, such as oleic, elardic, linoleic, α-eleostearic, β-eleostearic, erucic, ricinoleic and alkyl esters of such acids wherein the alkyl moiety is methyl, ethyl, n-propyl, isopropyl, n-butyl, isobutyl, t-butyl, isopentyl, t-pentyl, n-heptyl, benzyl and the like. In addition to the above unsaturated aliphatic carboxylic acids and esters of same, lower unsaturated carboxylic acids such as acrylic acid, itaconic acid, crotonic acid, cinnamic acid, and esters thereof can also be used.

The polyepoxides which are operable in this invention are those which have at least two 1,2-epoxy groups per molecule. The term 1,2-epoxy groups can be structurally represented as

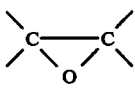

The polyepoxide constituent may be saturated or unsaturated aliphatic, cycloaliphatic, aromatic or heterocyclic and may be substituted with non-interfering groups such as halogen, alkyl and alkoxy. Such polyepoxides are disclosed in U.S. Pat. No. 3,044,843, hereinafter incorporated by reference. Polyepoxides which are especially desirable are those containing terminal epoxy groups, i.e.

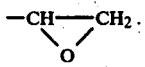

Such polyepoxides are commercially available and are marketed, for example, under the trade name Eponite 100 and Epon 562.

The molecular weight of the polyepoxides used in forming the compositions of the subject invention which impart improved dyeing properties to textile materials containing polyester or polyolefins fibers can vary widely. Generally, however, the polyepoxides will have a molecular weight in the range of from about 90 to about 4500. Further, the polyepoxides useful in the present invention may be either water-soluble or water-insoluble. It is desirable, however, that the polyepoxide employed by water-soluble since applications of the fatty polyamide and polyepoxide to the textile material are preferably accomplished by contacting the textile material with an aqueous admixture containing such constituents. If water-insoluble polyepoxides are employed, it may be desirable to incorporate into the aqueous admixture containing the polyepoxide an effective amount of a dispersing or emulsifying agent which is well known to those skilled in the art. However, the particular dispersing or emulsifying agent chosen should be inert to the desired reaction between the polyamide and the polyepoxide.

In order to obtain the desired deposition of the reaction product of the polyamide and the polyepoxide on a textile material containing polyester or polyolefin fibers, it is desirable that the reaction between the polyamide and the polyepoxide be hindered or prevented until such constituents have been brought into contact with the textile material so that improved bonding of the polyamide-polyepoxide reaction product to the polyester or polyolefin fibers can occur. In the practice of the present invention the polyamide-polyepoxide reaction product is formed on the textile fibers by impregnating the textile material with an aqueous admixture containing a polyamide and a polyepoxide. Any suitable means, such as padding, dipping, spraying or the like can be employed to wet the textile fibers of the textile material with the aqueous admixture. The amount of polyamide and polyepoxide employed in the aqueous admixture can vary widely. However, it is generally desirable that the aqueous admixture contain from about 0.1 to 50 weight percent of the polyamide and from about 5 to about 500 weight percent amounts, based on the amount of the polyamide, of the polyepoxide. Especially desirable results can be obtained when the aqueous admixture contains from about 2 to about 10 weight percent of the polyamide and from about 20 to about 100 weight percent of the polyepoxide.

To ensure uniform deposition of the polyepoxide and polyamide on the textile material, it is preferred that the textile material be cleaned and free from spinning oils, lubricants, sizing materials and other extraneous substances prior to application of the polyepoxide and polyamide. Any suitable means for cleaning the textile material may be employed such as scouring with conventional aqueous washing media containing soap or synthetic detergents, solvent washing and the like. Such methods for cleaning the surface of textile materials containing polyester or polyolefin fibers, such as polypropylene, are well known to those skilled in the art. Further, it may be desirable, when applying the composition of the present invention to a textile material containing polyolefin fibers, such as polypropylene fibers, to mechanically and/or chemically modify the surface of the textile material, prior to application of the aqueous admixture containing the polyamide and polyepoxide, in order to enhance adhesion of the polyamide-polyepoxide reaction product to the textile material. Such methods of mechanically and/or chemically treating the surfaces of textile materials containing polyolefin fibers are well-known in the art.

As previously stated, it is desirable that the reaction between the polyamide and the polyepoxide be hindered until such constituents have been brought into contact with the textile material. Such can be accomplished by reacting the polyamide, prior to the addition of the polyepoxide, with an effective amount of a volatile organic acid so as to convert the free amine groups of the polyamide to their acid salts, e.g. neutralize the free amine groups of the polyamide. Further the amount of organic acid employed should be an amount sufficient to provide the aqueous admixture with a pH level of less than about 7, preferably a pH level in the range of from about 2 to about 5.5. Thereafter, the polyepoxide is added to the aqueous admixture containing the neutralized polyamide.

Any suitable volatile organic acid can be employed to neutralize the polyamide. Typical of such volatile organic acids are acetic acid, formic acid, propionic acid, butyric acid and the like.

The aqueous admixture so prepared is then applied to the textile material so as to sufficiently wet the fibers of the textile materials and to provide from about 0.1 to about 10 weight percent, based on the weight of the fabric, of the polyamide and polyepoxide reactants. Desirable results can be obtained when the textile material is wetted with the aqueous admixture in an amount sufficient to provide from about 1 to about 7 weight percent of the polyamide and polyepoxide reactants on the textile material. Thereafter the wetted textile material is heated to a temperature effective to remove water and the organic acid constituent which is regenerated from the polyamide salt. The temperature at which the wetted fabric is heated can vary widely, as can the required length of time to remove the water and the organic acid. Generally, however, the wetted fabric will be heated to a temperature in the range of from about 225° F. to about 275° F. for a period of time of from about 20 seconds to about 5 minutes. After removal of the water and organic acid the textile material containing the polyamide and the polyepoxide is heated to a temperature in the range of from about 250° F. to 480° F. for a period of time effective to allow reaction between the polyamide and the polyepoxide, and thus same. However, care should be exercised so as not to exceed the melting temperature of the textile material. The amount of time required for the polyamide and the polyepoxide to react and cure can vary widely but will generally be from about 20 seconds to 5 minutes, such depending to a large extent on the particular polyamide and polyepoxide used, as well as the amounts of such compounds applied to the polyester or polyolefin fibers of the textile materials.

The textile materials containing polyester or polyolefin fibers, such as polypropylene, which have been treated as above can readily be dyed with acid dyestuffs using procedures well known by those skilled in the art, such as a continuous pad/steam dyeing process, an atmospheric back dyeing process and the like. However, in producing the products of the present invention, the dyebath employed must contain, as the dyestuff, an anionic or acid dyestuff. Such acid dyestuffs are well known in the art. Illustrative of acid dyestuffs which are commercially available and which can be employed in a dyebath to dye the cured, polymer-modified fabric of the present invention are:

Nylomine Red A2B-100
Nylomine Green C3G
Nylomine Green CG
Xylene Fast Blue PR
Nylomine Blue A-3R
Brilliant Alizarine Milling Blue FGL
Telon Fast Blue A3GL
Irganol Brilliant Yellow 3GLS
Telon Yellow GRL
Lanasyn Yellow 2RL
Irgalan Black RBL
Nigrosine Jet L Conc.
Nylosan Black FWL
Tectilon Black GD
Telon Fast Black NW
Intralan Yellow 2BRL
Calcofast Gray G
Telon Yellow Brown 3GL
Nylomine Yellow B3G
Dimacide Light Orange N-R As is well known in the dyeing art, the dyebath will generally contain from about 0.2 to 15 weight percent of such acid dyestuffs, preferably from about 2 to about 8 weight percent. After dyeing, the dyed textile material can be rinsed, dried and heat set, if desired to remove any loosely bound dyestuff. Thereafter the dyed textile material can be further treated to improve the appearance, hand, crock-fastness and the like of the dyed material. The desirability of the further treatment of the dyed textile material will be determined largely by the end use for which the dyed textile material is to be employed. For example, when the dyed textile material is to be used in the fabrication of wearing apparel it is often desirable to apply from about 0.1 to 10 weight percent, preferably from about 1 to 2 weight percent, based on the total weight of the fabric of an acrylic polymer to improve and eliminate substantially any crocking of the dyestuff which might occur. If desirable, minor effective amounts of soil release agents, water-proofing agents, mildewcides, softeners and the like can be applied to the surface of the dyed textile material by any suitable means, such being well known in the art. Further, the dyed textile materials can be coated with a plasticized vinyl polymeric material, such as polyvinyl chloride, a polyester-segment-containing polyurethane, and the like, by coating procedures known in the art. Typical of such coating procedures are hot-roll calendering, cast-coating, and film lamination.

The amount of plasticized polymeric material applied to the cured, polymer-modified textile fabric can vary widely, but will generally be an amount sufficient to provide a vinyl coating on the resulting textile material of from about 0.1 to about 50 mils thick, preferably from about 2 to about 30 mils. Further, the vinyl coating can be applied in a single application, or as two or more applications. The vinyl formulation employed in the vinyl coating of the textile material can be any suitable formulation known to those skilled in the art. The particular vinyl formulation employed, as well as the coating procedure, will be determined largely by the end use of the cured, polymer-modified acid dyed, vinyl coated textile fabric.

When a textile material containing polyester fibers has been modified by impregnation of the polyamide-epoxy reaction product in accordance with the procedures set forth hereinbefore is subsequently dyed with an acid dyestuff and thereafter coated with a vinyl polymeric material migration of the dyestuff from the modified textile material into the plasticized vinyl polymeric coating is substantially eliminated. Further, adhesion of the plasticized vinyl polymeric coating to the modified textile material is greatly enhanced.

In order to further illustrate the invention the following examples are given. However, it is to be understood that such examples are given for illustrative purposes only and are not to be construed as unduly limiting the subjected invention as set forth hereinafter in the claims.

EXAMPLE I

A woven polyester fabric characterized as a 1.28 yard/pound fabric was desized and dried. The desized and dried fabric was then padded with an aqueous admixture having a pH of 4.5 and containing a polyamide, a polyepoxy compound, and acetic acid to provide a 50 percent wet pickup of the aqueous admixture on the fabric. The aqueous admixture contained the following:

4% polyamide - an amine-containing polyamide resin produced by the reaction of diethylene triamine with a dimer acid, the polyamide having the general formula

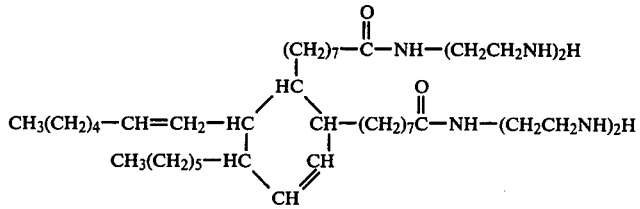

1.6% polyepoxide - a polyepoxy compound having the general formula

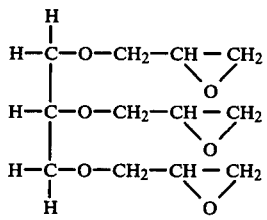

and having an average of about 2.6

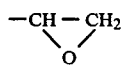

groups per molecule 1.5% glacial acetic acid.

The glacial acetic acid was admixed with the polyamide prior to introduction of the polyepoxide in order to form the acetate salt of the polyamide and thus prevent premature reaction between the polyamide and the polyepoxy compound.

After padding, the wetted fabric was heated to a temperature of 350° F. for 3 minutes to remove the water and also to remove acetic acid regenerated by conversion of the acetate salt of the polyamide back to the polyamide and thus allow reaction between the polyamide and the polyepoxy compound.

The modified fabric was then passed through a dyebath which was maintained at a temperature of 190° F. to 195° F. Thereafter, the dyed modified fabric was steamed, rinsed and dried. The dyebath employed contained the following:

2% Nylomine Green C-3G (Color Index Acid Green 28)
1% Acetic Acid (56%)
0.2% Triton X-200 Wetting Agent The dyed fabric was dried for three minutes at 250° F., rinsed with a cold aqueous solution containing 2% acetic acid, and thereafter rinsed with hot water. The rinsed dyed fabric was then dried at 250° F. for 2 minutes.

The dyed modified fabric was padded with an aqueous emulsion containing a clear acrylic polymer so as to provide 0.5 weight percent of polymer solids on the fabric. The acrylic-coated fabric was then dried and heat-set at 410° F. for 2 minutes.

The dyed and treated polyester fabric was thereafter tested for dye migration into a vinyl-coating. Such was accomplished by placing the vinyl-coated dyed polyester fabric into a forced-air oven and heating the fabric at 220° F. for 48 hours. At the end of the heating period the fabric was removed and examined. No migration of the dyestuff from the fabric into the vinyl-coating was detected.

EXAMPLE II

A woven polyester fabric characterized as a 1.28 yard/pound fabric and woven polyester/cotton blend fabric (75%/25%) characterized as a 1.56 yard/pound fabric were desized and dried. The desized and dried fabrics were then padded with an aqueous admixture to provide a 50% wet pickup of the aqueous admixture on each fabric. The aqueous admixture contained 5% of the polyamide of Example I, 2% of the polyepoxide of Example I; 2% glacial acetic acid and 0.2% of a nonionic surfactant sold under the tradename Syn-Fac 905.

As set forth in Example I, the glacial acetic acid was admixed with the polyamide prior to introduction of the polyepoxide so that the acetate salt of the polyamide was formed.

The padded fabrics were dried by passing same through an oven at the rate of 7 yards/minute. Such drying process not only removed water but allowed removal of the acetic acid. Also, such drying procedure enabled the epoxy compound to react with the polyamide. The oven was maintained at 250° F. and the fabrics were maintained in the oven for about 60 seconds. The dried fabrics were then cured at 325° F.

The modified fabrics were then passed through a dyebath which was maintained at 190° F. so as to provide a 50% wet pickup of the dyebath liquid by the fabrics. Thereafter, the wetted fabrics were passed through a steamer which was maintained at 212° F. The residence time in the steamer was 90 seconds. The steamed fabrics were then rinsed in cold water and dried at 250° F.

The dyebath employed contained the following:

4% Irgalan Black RBL (Color Index - Acid Black 132)
0.7% Superclear 80N (Leveling Agent)
0.3% Barisol Super BRM 200 (Surfactant)
0.6% Acetic Acid (56%)

The dyed, modified fabrics were then coated with a polymeric material. In each instance such coating was accomplished by applying 0.9% Rhoplex E-32 polymer solids (self-crosslinking acrylic emulsion) and 0.9% Rhoplex K-87 polymer solids (a second self-crosslinking acrylic emulsion), such coats being based on the weight of the fabric. The acrylic-coated dyed fabrics were then heated at 380° F. for 60 seconds and thereafter heat set at 410° F. for 30 seconds.

Upon examining the resulting polymer-coated dyed fabrics it was noted that the color of the fabrics had deepened in shade after the acrylic polymer coating. The fabrics were further examined and determined to have a wet crockfastness rating of 3.5 and a dry crockfastness rating of 4.5 according to the procedures of AATTC Test Method 8-1974.

The acrylic treated dyed fabrics were then vinyl-coated and placed into an oven maintained at a temperature of 220° F. for 48 hours to age such fabrics and to determine if migration of the dyestuff from the dyed fabric into the vinyl coating occurred. At the end of the aging process the fabrics were removed from the oven, cooled and examined. No migration of the dyestuff from the dyed fabrics into the vinyl coating was detected.

EXAMPLE III

A woven polyester fabric was desized and dried. The desized fabric was padded to provide 50% wet pickup of an aqueous admixture containing 6 weight percent of the polyamide of Example I and 3% weight of the polyepoxide of Example I. 3 weight percent of acetic acid (56 percent acid) was employed in the aqueous admixture to neutralize the polyamide and prevent premature reaction between the polyamide and the polyepoxide.

The padded fabric was dried and cured at 350° F. for 2 minutes. The modified fabric was then passed through an aqueous dyebath containing 2% of Cibacron Black FBGA, an acid reactive dyestuff of the monochlorotriazinyl type (Color Index Reactive Black 1), and 1 weight percent sodium hydroxide to provide a wet pickup of the dyebath by the fabric of 40%. The dyed fabric was dried at 250° F. for 2 minutes and thereafter steamed for 20 seconds. The cured, dyed modified fabric was rinsed with hot water to remove excess dye. The washed fabric was then dried at 240° F. The washed and dried fabric was examined and determined to have excellend wet and dry crockfastnesses.

The treated dyed fabric was then vinyl-coated and placed into an oven maintained at a temperature of 220° F. for 48 hours to age the vinyl-coated fabric so as to determine if migration of the dyestuff from the fabric into the vinyl coating occurred. No migration of the dyestuff into the vinyl coating was detected.

EXAMPLE IV

A sample of polypropylene carpet backing was padded with an aqueous admixture containing 16% of a polyamide, 8% of a polyepoxy compound, 7.6% acetic acid and 2% of a nonionic surfactant, sold under the trademark Syn-Fac 905, so as to provide 5 weight percent, based on the weight of the polypropylene, of the reaction product of the polyamide and polyepoxide on the polypropylene. The polyamide and polyepoxide employed were those set forth in each of the Examples I through III. As previously stated, the acetic acid prevents premature reaction between the polyamide and polyepoxide.

The padded polypropylene is dried at a temperature of 250° F. for 4 minutes to remove water and regenerated acetic acid. The dried polymer-coated polypropylene is thereafter cured at 280° F. for 4 minutes to insure substantial complete reaction between the polyamide and the polyepoxide and to further remove any residual acetic acid. The cured, polymer-coated polypropylene was tufted with Nylon 66 carpet and the resulting carpet sample was then dyed using a beck dyeing procedure. Such procedure consists of the following sequential steps:

A. Weigh carpet sample.
Prepare dyebath containing an aqueous dye liquor having a weight ratio of liquor to carpet sample of 35:1.
C. Add 4 weight percent of dye to dye liquor, based on weight of carpet sample.
D. Heat resulting dyebath to 200°–212° F.
E. Maintain carpet sample in contact with heated dyebath for 1 hour.
F. Remove sample and rinse with water.
G. Dry dyed sample at elevated temperature.

The dyebath used in this example contained 4% Erionyl Red BW dyestuff (Color Index Acid Red 151) and 0.5% monosodium phosphate.

The polypropylene backing which had been treated with the polyamide-polyepoxide reaction product dyed to a similar shade as the nylon 66 fibers of the carpet sample; whereas, the untreated polypropylene backing showed no dye uptake.

EXAMPLE V

Experiments were conducted to prepare a secondary amine polymer. In each experiment the secondary amine polymer was prepared as follows:

103 parts of diethylene triamine, 306 parts of the dichloride of polyethylene glycol 600 and 400 parts of butanol are mixed in a vessel equipped with mechanical stirrer, thermometer and reflux condenser. The mixture is heated with vigorous agitation at the reflux temperature (120° C.) for two hours. A precipitate of diethylene triamine dihydrochloride forms during this heating period. At the end of two hours, argentometric titration, carried out patentometrically, indicate that, based on two measurements, 98.8% to 100% of the available chloride has reacted. 100 parts of water are added, and the butanol is vacuum-distilled, care being taken that the temperature of the residue does not exceed 70° C. (at 40–60 mm. of Hg). The resulting amine product present in the reaction mixture is viscous, yellow, completely water-soluble and has a purity of greater than about 98.5%.

A first 20% aqueous solution was prepared containing 30 parts of the secondary polymer reaction mixture prepared above and 2.35 parts of epichlorohydrin. The pH of the aqueous solution was adjusted to 11 by the addition of the required amount of sodium hydroxide.

A second 20% aqueous solution was also prepared containing 30 parts of the secondary amine polymer reaction mixture and 2.35 parts of epichlorohydrin except the pH of the aqueous solution was adjusted to 6 by the addition of the required amount of acetic acid.

A third aqueous solution having a pH of 4.5 to 5 and containing 5.3 percent of the polyamide of Example I, 2.6 percent of the polyepoxide of Example I, 2.6 percent acetic acid (84% concentration by weight) and 0.1 percent of an alkyl aryl polyether alcohol, a commercially available surfactant sold under the tradename Triton X-100 was also prepared.

An undyed, desized 100% polyester fabric characterized as a 2.73 yd/lb. fabric was padded with the previously described first aqueous solution at room temperature and at a nip-roll pressure sufficient to give 85% wet pickup. The wetted fabric was cured at 212° F. for 15 minutes. After curing and drying, the fabric was subjected to a mild rinse with an aqueous solution containing 0.1% nonionic surfactant (Neutronyx 600) to remove unreacted soluble material. The rinsed fabric was then dried at 250° F. for 4 minutes. The resulting treated fabric is hereinafter referred to as treated fabric I.

An undyed, desized polyester fabric (100% polyester) substantially identical to that treated above was padded, with the second aqueous solution previously described above, cured, rinsed and dried using the same procedure as set forth when using the first aqueous solution. The resulting treated fabric is hereinafter referred to as treated fabric II.

An undyed, desized polyester fabric (100% polyester) substantially identical to the fabric treated with the first and second aqueous solution was treated with the third previously described aqueous solution containing the polyamide and polyepoxide compound in accordance with the subject invention. The third aqueous solution was padded onto the polyester fabric at room temperature and at a nip-roll pressure sufficient to give 85% wet pickup. The wetted fabric was then dried at 250° F. for 4 minutes to remove water and regenerated acetic acid so that the desired reaction between the polyamide and polyepoxide could occur. Thereafter the dried treated fabric was cured for 1 minute at 325° F. The resulting treated fabric is hereinafter referred to as treated fabric III.

Sample portions of each of the above described treated fabric I, II and III were dyed and the results compared using two separate dyeing procedures. One procedure, referred to as a pad/steam procedure, consisted of the following sequential steps.

A. Mix water and dyestuff (4% on weight of bath) while stirring;
B. Acidify the resulting admixture with an effective amount of acetic acid to provide the admixture with a pH level of 4.5 to 5.0.
C. Add 1%, based on the weight of the bath, of a leveling agent (Superclear 80N);
D. Add 0.3%, based on the weight of the bath, of a surfactant, (Barisol Super BRM);
E. Adjust the resulting solution to the desired volume by addition of water;
F. Heat the resulting dye bath to 165° F.;
G. Pad each sample of the treated fabrics I, II and III at a nip-roll pressure sufficient to give 85% wet pickup;
H. Steam the dyed fabrics at 230° F. for 2 minutes;
I. Rinse the steam set dyed fabrics with a cold aqueous solution containing sufficient acetic acid to give a pH level of 5.0 to 6.5 and thereafter rinse with hot water to remove loosely bound dyestuff; and
J. Dry the rinsed dyed fabric samples at 250° F. for 4 minutes.

The second dyeing procedure, referred to as the dyeing by exhaustion procedure, consisted of the following sequential steps:

A. Add 4% dyestuff (based of the weight of the fabric) to hot water while stirring;
B. Acidify the resulting admixture with an effective amount of acetic acid to provide the admixture with a pH level of 3–4;
C. Adjust the dyebath volume to the desired level (liquor/fabric ratio of 100/1) by the addition of hot water;
D. Bring the dyebath volume of a boil and maintain the fabric sample in the boiling dyebath for 60 minutes;
E. Rinse the stream-set dyed fabrics with a cold aqueous solution containing sufficient acetic acid to give a pH level of 5.0 to 6.5 and thereafter rinse with a hot water to remove loosely bound dyestuff; and
F. Dry the rinsed dyed fabric samples at 250° F. for 4 minutes.

Two different acid dyes were applied under the previously described conditions: C. I. Acid Red 151 and C. I. Acid Black 132. Half of these treated-and-dyed fabrics were then coated with a polymeric material similar to that described in Example II, and half were not thus coated. In this case, the coating was accomplished by applying 1.6% Rhoplex E-32 polymer solids (self-crosslinking acrylic emulsion), 1.6% Rhoplex K-87 polymer solids (a second self-crosslinking acrylic emulsion), and 0.7% Aerotex Resin MW polymer solids (modified melamine-formaldehyde condensate), such levels of coating being based on the weight of the fabric. These acrylic-coated dyed fabrics were then heated at 325° F. for 3 minutes, which accomplished both polymer-curing and fabric heat-setting.

The dyed and/or coated fabrics resulting from dyeing treated fabrics I, II and III using each of the above dyeing procedures were then compared as to dye uptake, dye migration, crockfastness, and lightfastness.

The dye-uptake results showed clearly that far more dye goes on Fabric III than on Fabric II. In the case of Fabric I, about as much dye on the fabric results as for Fabric III when the pad/steam procedure is used, but the resulting fabric is not "on shade"—i.e., Fabric I's color is changed for the worse from the desired shade. However, when both fabrics are dyed by the exhaustion procedure Fabric III again exhibits heavier dyeing than Fabric I.

Dye migration was evaluated by examining the color formed in the extracting liquid plasticizer when the variously dyed samples were immersed in such a plasticizer. The plasticizer employed was that commonly used to plasticize polyvinyl-chloride coatings. Specifically, fabric samples in the form of small fabric snippets from the main fabric sample were immersed at a liquor/fabric ratio of 50/1 in di-2-ethylhexyl phthalate plasticizer for 72 hours at 200° F. After removal of the fabric snippets from the plasticizer it was determined that the dye migration of Fabric III samples was less than that of Fabric I samples. In some cases the migration of Fabric II samples was less than that of Fabric III samples, but these Fabric II samples were far less heavily dyed, as noted above.

The results for both dry and wet crockfastnesses (AATCC Test Method 8-1974) indicate the Fabric I and Fabric III samples to show about equal behavior. One might expect the Fabric II samples to exhibit better crockfastness than the others, because of the lower amounts of dye resulting on these fabrics, but these Fabric II samples exhibit no such advantage.

Lightfastness after 20 and 40 hours exposure to a Xenon-arc lamp (AATCC Test Method 16E-1976) was measured for all the samples. In nearly all instances the Fabric III samples were superior to the Fabric I and Fabric II samples. In only one instance, when C.I. Acid Black 132 was applied by the pad/steam procedure, did the Fabric I and II samples show better behavior than the Fabric III samples, and such was by only a relatively small degree.

The above examples clearly indicate the improved properties, both as to dyeability and dye migration, imparted to textile fabrics containing polyester or polypropylene fibers when employing the composition and method of the present invention. Further, by employing the unique compositions of the present invention, e.g. the reaction product of a polyamide and a polyepoxide having at least two 1,2-epoxy groups per molecule, the adhesion of a vinyl film to a textile substrate, such as textile fabrics containing polyester fibers, is greatly improved. Such improved adhesion properties imparted to a textile substrate by the compositions of the present invention are further illustrated by Examples VI and VII.

EXAMPLE VI

Formulations comprised of the polyamide and polyepoxide of Example I were applied to a 100% polyester woven fabric 1.28 yd./lb. to evaluate the adhesive properties to a vinyl film. Laminations of vinyl film (6 mil thickness) to treated polyester fabric were made in a press with heated plates (300° F.), 125 psi, and a six-minute cycle.

A 3.5% o.w.f. level of the reaction product of the polyamide and polyepoxide was applied to fabric and cured. Weight ratios of polyamide to the polyepoxide were varied at this polymer add-on. Both treated and untreated 100% polyester woven fabric (1.28 yd./lb.) were laminated to vinyl film.

A "Latin Square Designed Experiment" was run. After taking account of statistical "noise" in the experiment, a two-fold increase in adhesion was obtained by the treatment at an apparent optimum polyamide/epoxy ratio (1.0/0.77). The data are summarized below:

| Weight Ratio: Polyamide/Epoxy | 180° Peel Adhesion, Integrated Values (Grams) |
| --- | --- |
| 4.9/1.0 | 219 |
| 2.4/1.0 | 172 |
| 2.0/1.0 | 218 |
| 1.0/0.77 | 287 |
| 1.0/1.0 | 280 |
| Untreated | 129 |
| Pooled 95% Confidence Limit | ±33 |

EXAMPLE VII

Formulations comprised of the polyamide resin and the epoxide resin of Example I were applied to a 100% polyester woven fabric 1.28 yd./lb. in varying amounts of polymer add-on. With a given level of polymer application samples were prepared at differing weight ratios of polyamide and epoxide and tested for adhesion to vinyl film (6 mil thickness) using the same procedure set forth in Example VI, the following results were obtained:

| Polymer, % o.w.f. | 180° Peel Adhesion, Integrated Values (Grams) Weight Ratio | | | | |
| --- | --- | --- | --- | --- | --- |
| | 4.9/1.0 | 2.4/1.0 | 2.0/1.0 | 1.0/0.77 | 1.0/1.0 |
| Untreated | 204g | | | | |
| 1.75 | 512 | 460 | 182 | 386 | 340 |
| 3.5 | 286 | 382 | 460 | 324 | 175 |
| 7.0 | 496 | 394 | 371 | 289 | 226 |
| 10.5 | 497 | 447 | 412 | 297 | 186 |

Having thus described the invention, I claim:

1. A method for improving the dyeing characteristics of textile material consisting essentially of polyester or polyolefin fibers which comprises:
   (a) forming an aqueous admixture containing from about 0.5 to about 50 weight percent of a polyamide and an effective amount of a volatile organic acid to substantially neutralize free amine moieties of said polyamide and to provide a pH of said aqueous admixture within the range of from about 2 to about 5.5;
   (b) admixing from about 5 to about 500 weight percent, based on said polyamide, of a polyepoxide having at least two 1,2-epoxy groups per molecule into said admixture to form a resulting aqueous admixture;
   (c) applying said resulting aqueous admixture to said textile material to wet the fibers of said textile material;
   (d) heating the wetted textile material to a temperature of from about 250° F. to about 480° F. for a period of time effective to remove water and the volatile organic acid constituent regenerated by such heating, to allow reaction between said polyamide and said polyepoxide and provide a polyamide-polyepoxide reaction product modified textile material, and to cure said polyamide-polyepoxide reaction product.

2. The method of claim 1 wherein said volatile organic acid is selected from the group consisting of acetic acid, formic acid, propionic acid and butyric acid.

3. The method of claim 2 wherein said wetted textile material is heated for a period of time of from about 20 seconds to about 5 minutes.

4. The method of claim 3 wherein said resulting aqueous admixture is applied to said textile material in an amount sufficient to provide from about 0.1 to about 10 weight percent of said polyamide and said polyepoxide on said material.

5. The method of claim 4 which includes the step of cleaning the textile material prior to application of said resulting aqueous material thereto.

6. The method of claim 4 wherein said polyamide is employed in said resulting liquid admixture in an amount of from about 2 to about 10 weight percent and said polyepoxide is employed in an amount of from about 20 to about 100 weight percent.

7. The method of claim 6 wherein said polyamide contains at least one functional group represented by the formula

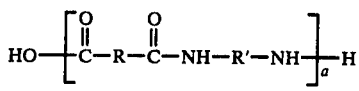

wherein R is an alkyl, alkylene, cycloalkyl or cycloalkylene, R' is an alkyl, cycloaliphatic, aromatic or alkyl substituted amino group, and a is an integer of from 1 to about 10 and said polyepoxide is represented by the formula

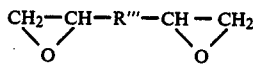

wherein R is an aliphatic, cycloaliphatic, aromatic or heterocyclic group.

8. The method of claim 7 wherein said polyamide contains at least one functional group represented by the formula

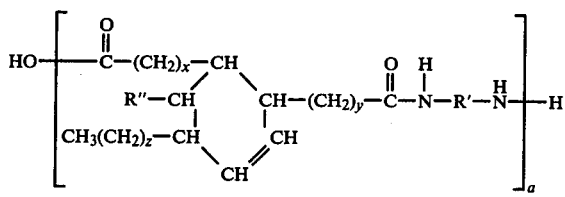

wherein x, y and z are each integers of from 0 to about 12 and R'' is an alkyl, alkylene, cycloalkyl or cycloalkylene group.

9. The method of claim 8 wherein x and y are each integers of from about 7 to about 11 and z is an integer of from about 4 to about 7.

10. The method of claim 8 wherein said polyamide is represented by the formula

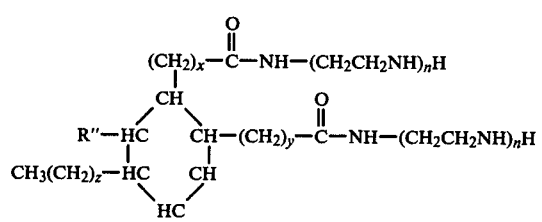

wherein n is an integer of from 0 to about 4.

11. The method of claim 10 wherein said polyamide is

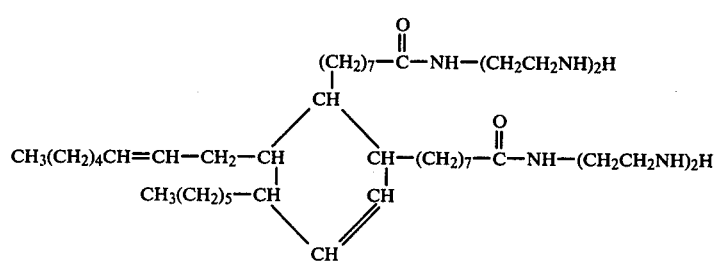

and said polyepoxide is

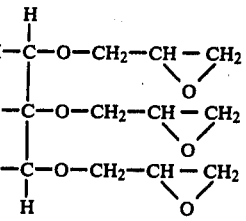

and is further defined as having an average of about 2.6

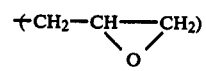

groups per molecule.

12. A vinyl-coated, acid dyed, polymer-modified textile material consisting essentially of polyester or polyolefin fibers which comprises:
a textile material substrate formed of polyester or polyolefin fibers having impregnated therein from about 0.1 to 10 weight percent of a cured polymeric constituent formed as the reaction product of a polyamide and a polyepoxide having at least two 1,2-epoxy groups per molecule and wherein the polymer impregnated substrate has been dyed with an anionic dyestuff to provide an acid dyed polymer-modified textile material substrate; and a vinyl coating on said acid dyed polymer-modified textile material substrate, said vinyl coating having a thickness of from about 0.1 mils to about 50 mils.

13. The vinyl-coated, acid dyed, polymer-modified textile material of claim 12 wherein said polyamide of said reaction product contains at least one functional group represented structurally by the formula

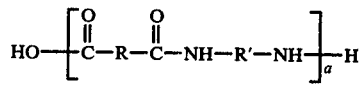

wherein R is an alkyl, alkylene, cycloalkyl, or cycloalkylene group, R' is an alkyl, cycloaliphatic, aromatic, or alkyl substituted amino group, and a is an integer of from about 1 to about 10; and, said polyepoxide is represented by the general formula

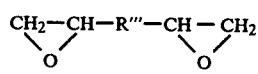

wherein R''' is an aliphatic, cycloaliphatic, aromatic or heterocyclic group.

14. The vinyl-coated, acid dyed, polymer-modified textile material of claim 13 which further includes from about 0.1 to about 10 weight percent, based on the total weight of the fabric, of an acrylic polymer, said acrylic polymer forming a film between the acid dyed polymer-modified textile material and said vinyl coating.

15. The vinyl-coated, acid dyed, polymer-modified textile material of claim 14 wherein said acrylic polymer is present in an amount of from about 1 to about 7 weight percent, and wherein said vinyl coating has a thickness of from about 2 to about 30 mil.

16. The vinyl-coated, acid dyed, polymer-modified textile material of claim 14 wherein said vinyl coating is formed of a polyvinyl chloride resin or a polyester-segment-containing polyurethane resin.

17. The vinyl-coated, acid dyed, polymer-modified textile material according to claim 16 wherein said polyamide of said reaction product contains at least one functional group represented by the formula

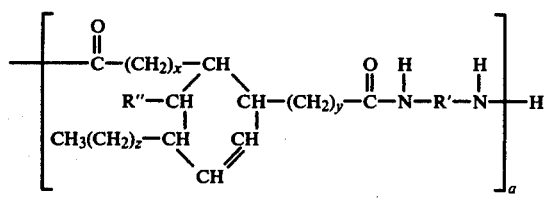

wherein x, y and z are each integers of from 0 to about 12 and R" is an alkyl, alkylene, cycloalkyl or cycloalkylene group.

18. The vinyl-coated, acid dyed, polymer-modified textile material of claim 17 wherein said polyamide is represented by the formula

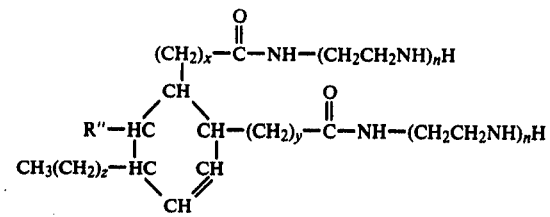

wherein n is an integer of from 0 to about 4.

19. The vinyl-coated, acid dyed, polymer-modified textile material according to claim 18 wherein said polyamide is

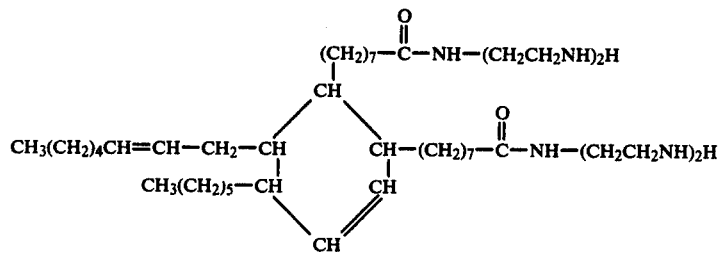

and said polyepoxide is

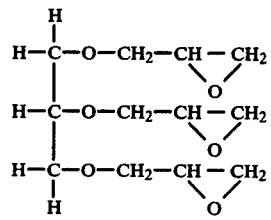

and is further defined as having an average of about 2.6

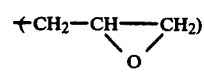

groups per molecule.

20. The vinyl-coated, acid dyed, polymer-modified textile material of claim 19 wherein said textile material substrate is formed of polyester fibers.

* * * * *